United States Patent Office 3,570,087
Patented Mar. 16, 1971

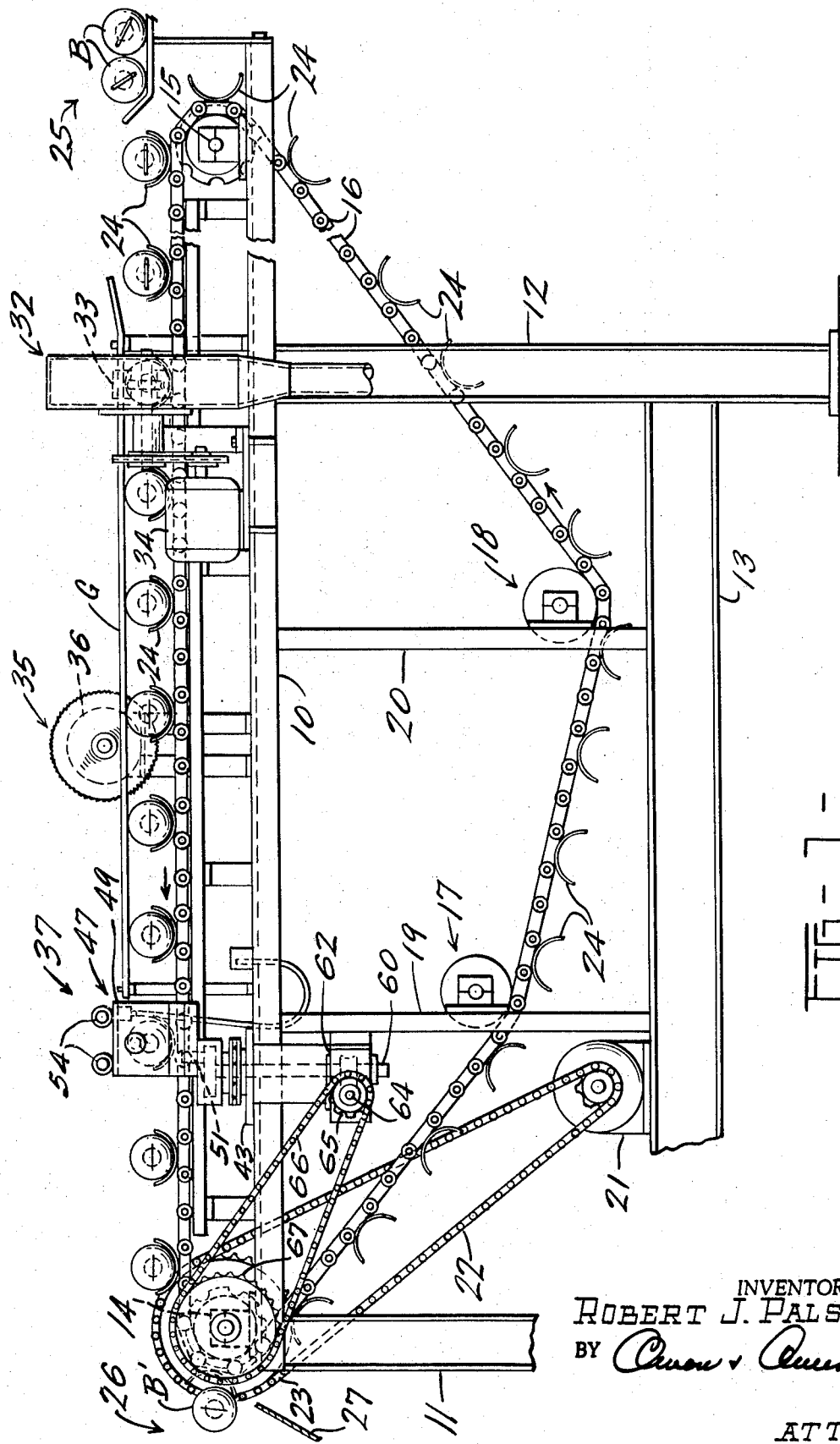

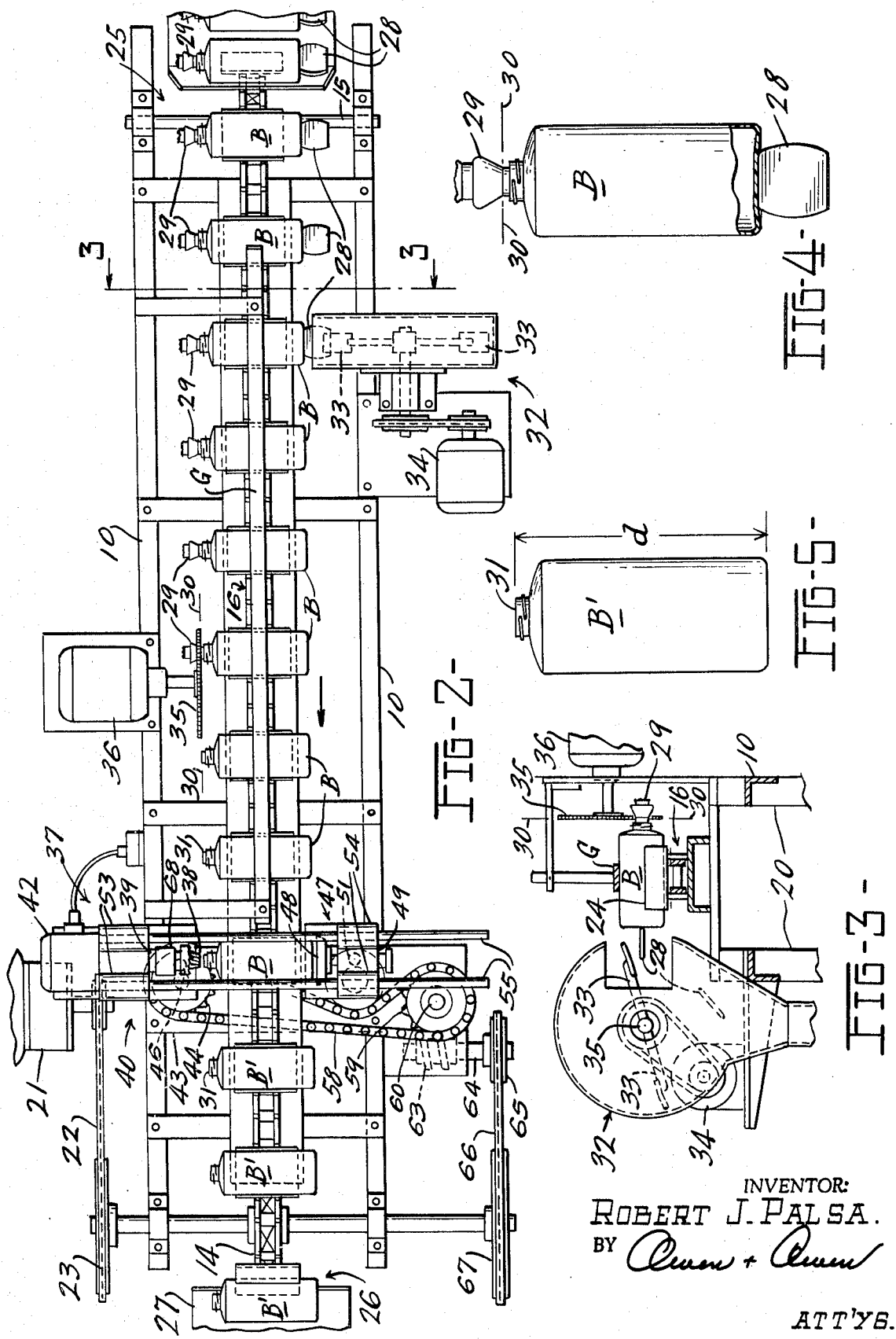

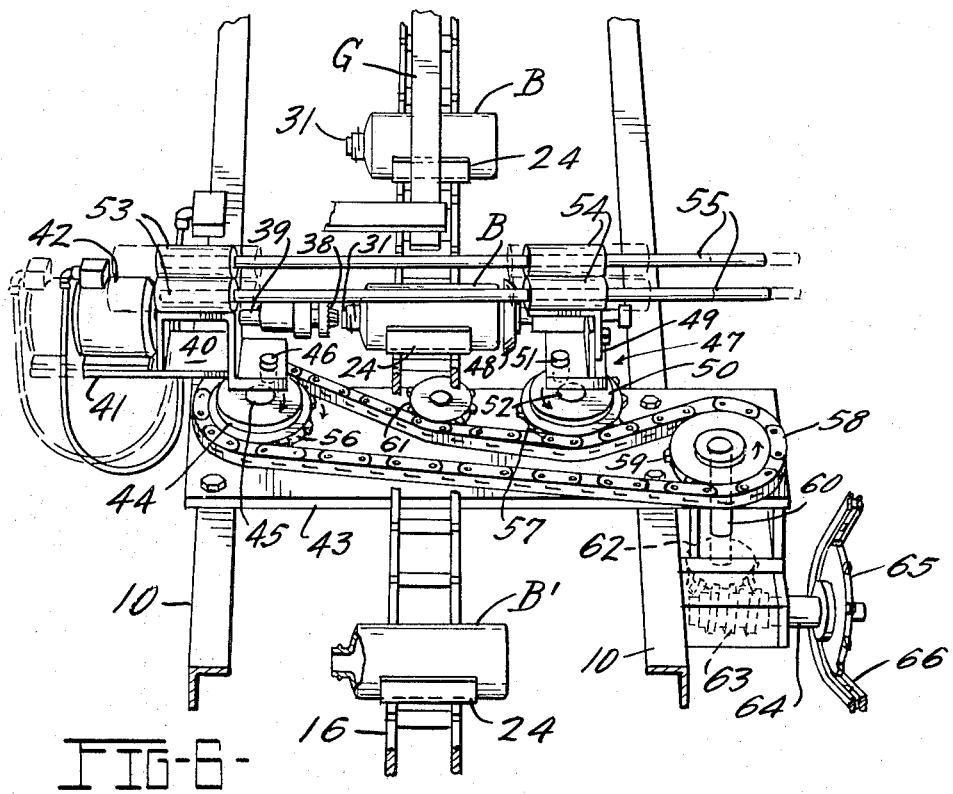
FIG-6-
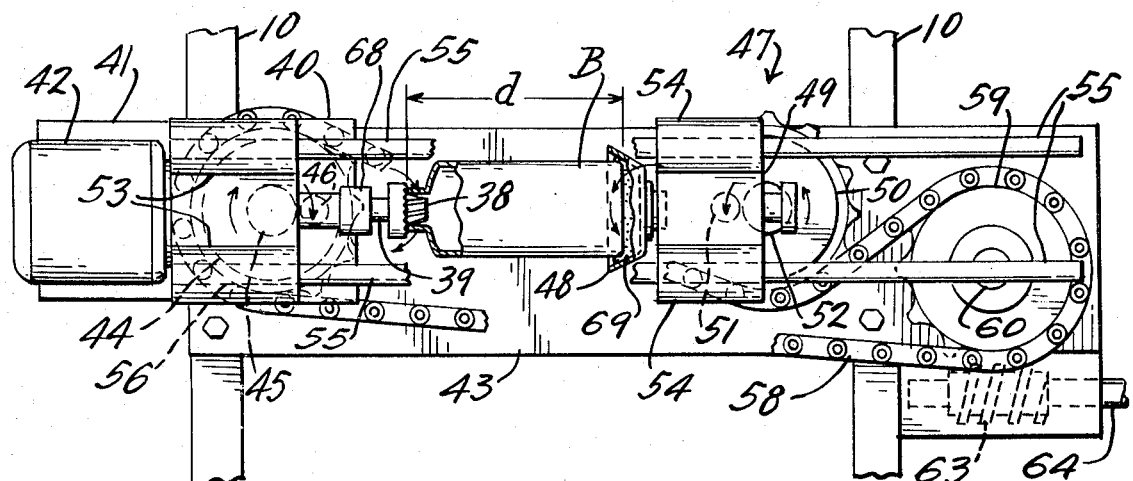
FIG-7-
INVENTOR:
ROBERT J. PALSA.
BY Owen + Owen
ATT'YS.

3,570,087
BOTTLE TRIMMING APPARATUS
Robert J. Palsa, 6133 Acoma Drive,
Toledo, Ohio 43623
Filed Jan. 27, 1969, Ser. No. 793,968
Int. Cl. B23q 7/04
U.S. Cl. 29—33                                    10 Claims

ABSTRACT OF THE DISCLOSURE

A device for trimming molded plastic articles carried by a continuously moving conveyor, which device includes a mechanism for reciprocating a trimming tool in and out of the path of said conveyed articles in synchronism with the conveyor so that each article is trimmed by the tool. The device includes a power driven tool and article support which are positioned opposite one another on each side of the conveyor. A drill and support are mounted on rotary platforms which cause them to repetitively move into trimming engagement, maintain trimming engagement, and thence disengage each article as it is carried past the rotary platforms by the conveyor.

---

This invention is a flash or waste trimming apparatus particularly adapted for use in trimming and finishing molded plastic articles such as bottles, flasks, and other containers. More particularly, the invention is a bottle trimming machine which facilitates the high-speed removal of the flash formed on each end of a blown plastic bottle and includes a device for trimming or reaming the neck of the bottle so that it will make an air- or liquid-tight seal with the cap to be added to the bottle.

BACKGROUND OF THE INVENTION

Blow-molded plastic bottles are currently in wide use as containers for a number of widely marketed liquid products, such as household detergents, bleaches and certain liquid foods and juices. Because of the extremely high production volume required to meet the commercial demand for such blown plastic bottles, complex molding machines for molding the bottles at high speed have been developed and a number of flash trimming machines for removing unwanted flash and other waste are also being utilized to eliminate the slow and costly practice of removal of flash by manual methods.

In certain prior art machines, such as that illustrated by United States Patent 2,943,349, a flash trimming apparatus is incorporated directly along with the molding machine so that the neck of the bottle is trimmed and reamed while the recently formed bottle is held between closed mold halves in stationary position.

In other trimming machines, such as that illustrated by United States Patent 3,319,498, bottles are removed from the molding machine and are trimmed by a separate process. In this latter type of machine of the prior art, particularly where the bottle is to be reamed by a rotary drill which is placed within the open neck of the bottle to ream the lip or edge surfaces, the bottles being trimmed are carried on a conveyor which stops to place the bottle in a fixed position where the trimming drill engages the neck of the bottle. In other such machines, the bottles are carried by a conveyor which includes a mechanism for removing the bottle from the conveyor to a trimming station and thence returns the bottle to the conveyor after it has been trimmed. In all cases, the trimming process is relatively slow due to the necessity of stopping the bottle while it is trimmed.

Because of the aforementioned high volume required by manufacturers whose products are sold in such plastic bottles, it has been found desirable to perform all trimming operations at a very high speed. The present invention accomplishes this goal by providing a bottle trimming apparatus which includes a continuously moving conveyor and a means for moving a trimming tool, such as a neck drill, in synchronism with the conveyor so that the trimming tool will serially engage each of a number of bottles carried by the continuously moving conveyor as each such bottle passes the position of the drill.

SUMMARY OF THE INVENTION

The present invention includes a bottle trimming machine which has a continuously moving conveyor for conveying blown plastic bottles past several trimming devices, one such device being a trimming drill which is inserted in the neck of the bottle to remove excess flash and other waste and which reams or smoothes the upper surface of the neck so that it will make a satisfactory seal with the later-applied screw-type cap for the bottle. The machine accomplishes its high speed trimming through use of a trimming drill which is driven, in synchronism with the conveyor, from a remote position free of the conveyor and bottles thereon, through a bottle-engaging position in which the trimming drill engages the neck of the bottle to perform its trimming operation, and back to the remote position. In the engaged position, the drill will move along with the bottle in the direction of movement of the conveyor so that the bottle may be trimmed while moving, thus eliminating the necessity for stopping the conveyor or bottle and thus slowing down the trimming operation.

Other objects and advantages of the present invention will be apparent to those skilled in the art and will be understood from the following drawings and brief description of a preferred embodiment of the invention.

BRIEF DESCRIPTION OF THE DRAWINGS

FIG. 1 is a view in elevation of a complete bottle trimming machine which incorporates the above described invention and which further includes certain other conventional bottle trimming devices;

FIG. 2 is a plan view of the bottle trimming apparatus of FIG. 1, showing in some detail the bottle drill and the mechanism for reciprocating it;

FIG. 3 is a view take along lines 3—3 of FIG. 2, showing an end view of the conveyor of the apparatus and the manner in which bottles carried on the conveyor are presented for certain trimming operations;

FIG. 4 is a schematic illustration of a blown plastic bottle as it comes from the molding machine with unwanted flash or waste on each end;

FIG. 5 is a view of a trimmed bottle which has been trimmed by the apparatus of this invention to remove the unwanted flash;

FIG. 6 is a view in perspective of the trimming drill and drive apparatus of this invention, shown in a position in which the trimming drill and opposed bottle support are free of and not in engagement with a bottle on the conveyor; and FIG. 7 is a plan view of the rimming drill and drive apparatus of this invention, showing the trimming drill and opposed support member in trimming engagement with a bottle carried by the conveyor.

BRIEF DESCRIPTION OF A PREFERRED EMBODIMENT

Referring to FIGS. 1 and 2, the trimming apparatus illustrated includes a horizontal bed formed by spaced-apart rails 10 which are supported by pairs of vertical legs 11 and 12 connected by a cross member 13. Suitable transverse members connect the rails and legs. On each end of the horizontal bed 10 is a conveyor guide or roller 14 or 15 which guides the bottle conveyor belt, generally designated by reference numeral 16, horizontally across the upper surface of the bed 10. A pair of return rollers or guides 17 and 18 are positioned below the horizontal bed 10 on vertical supports 19 and 20, respectively. Each of the conveyor rollers 14, 15, 17 and 18 include sprockets or other engaging members for engaging the conveyor belt 16 and for guiding it around its path in the direction shown by the arrows. The details of construction of the conveyor 16 and its associated mechanism are conventional and do not form a part of this invention.

The conveyor 16 is driven by an electric motor 21 mounted on the cross member 13 through a belt or chain 22 which engages a pulley or chain sprocket 23 secured to the shaft of the conveyor roller 14, as best seen in FIG. 2. Rotation of the motor 21 in the direction shown by the arrow thereon in FIG. 1 will effect movement of the conveyor 16 in the direction shown by the arrows. Because the movement of the conveyor is continuous, no complex start-stop mechanism are needed and the motor 21 can be controlled merely by an On and Off switch and a suitable electrical speed control.

Secured at equally spaced intervals to the conveyor belt 16 are a plurality of semi-cyclical bottle carriers 24 which move with the conveyor through its path of movement. As seen in the right-hand side of FIG. 1, a bottle loading station, generally designated by reference numeral 25, is provided so that an operator may place untrimmed bottles B in each one of the bottle carriers 24 as it passes the conveyor roller 15 and starts movement across the upper run of the conveyor. The design of the bottle carriers 24 can be adapted to the shape of the bottle B being trimmed such that, for example, larger diameter bottles would, of course, be carried by bottle carriers 24 having a diameter large enough to receive them, etc. For this purpose, the individual bottle carriers 24 may be removably interchanged on the conveyors 16 to facilitate use of the machine with various sizes of bottles or other containers.

At the left-hand side of FIG. 1, a bottle unloading station, designated by reference numeral 26, is provided. As shown, the unloading station may comprise only a guide or chute 27 for directing the bottles as they fall from the bottle carriers 24 which will dump its trimmed bottle B' as the carrier 24 leaves the upper run of the conveyor and returns on the lower run to the loading station 25.

Referring to FIGS. 4 and 5, an untrimmed, blown plastic bottle, particularly when formed from an extruded parison blown in a partible mold, will contain undesired waste or flash on each end. As shown in FIG. 4, at the bottom end is a tail 28 which is formed when the lower end of the extruded parison is squeezed between mold halves and at the top end is an unwanted neck extension designated by reference numeral 29, formed above the screw neck of the bottle B. The apparatus of the instant invention includes conventional means for removing the tail 28, for cutting off the neck flash 29 along line 30—30 in FIG. 4, and for finishing the cut surface on the neck so that a conventional screw cap, having a minimum of resilient gasket, will make a good fluid- or liquid-tight seal with the lip or upper surface of the neck, designated by reference numeral 31 in FIG. 5.

Referring to FIGS. 2 and 3, after untrimmed bottles B are placed upon the bottle carriers 24 at the loading station 25, they move along with the conveyor belt 16 under an overhead guide G, best seen in FIG. 1, which holds each bottle B within its carrier 24 during subsequent operations. The bottles B then proceed past a conventional tail-removing apparatus, generally designated by reference numeral 32. This apparatus includes a driven paddle 33 which is rotated at high speed by a motor 34. The shaft 35 of the paddle is positioned adjacent the conveyor 16 so that the end of the paddle 33 will strike the tails 28 of each of the untrimmed bottles B as they pass the position of the paddle 33, as shown in FIGS. 2 and 3. Because the line of juncture with the tail 28 and the bottom of the bottle B is thin and weak a sharp blow by the paddle 33 will knock the tail 28 from the bottle. The severed tail 28 falls away from the apparatus as indicated in FIG. 3. Details of the design of the paddle and its mounting are conventional and will be apparent to those skilled in the art from inspection of FIGS. 2 and 3.

As the untrimmed bottles B proceed along the conveyor 16 in the direction indicated by the arrow, each one passes a circular saw 35 which is driven by a motor 36 secured to the bed 10 of the apparatus, as best seen in FIG. 2. The blade of the saw 35 is positioned in a plane which corresponds with the line 30–30 which separates the neck of the bottle from the unwanted flash, as shown in FIG. 4. As the bottles B move past the blade of the saw 35 and are held securely in the bottle carriers 24 by the overhead guide G, the unwanted excess flash 29 is severed from the neck of the bottle.

In place of the rotary saw 35, a reciprocating or guillotine-type knife can be used to remove the flash 29 from the neck of the bottles B. In either case, the upper lip or neck surface 31 remaining on the bottle must be smoothed and reamed in order to assure a tight seal with the gasket in the interior of the screw cap which is added after the bottle is filled. This is accomplished through use of a power-driven bottle drill which, with its accompanying drive mechanism, is illustrated in detail in FIGS. 6 and 7 and is designated by reference numeral 37 in FIGS. 1 and 2.

As can be seen from FIGS. 1 and 2, the bottle drill 37 is positioned adjacent the conveyor 16, downstream from the flash saw 35. Referring to FIG. 6, a drill bit 38 is secured to its drive shaft 39 which is journaled in a drill support 40 which includes a support flange 41 for a drill motor 42. As shown in FIG. 6, the shaft of the drill motor 42 may extend directly to the drill bit 38 through suitable bearings in the drill support 40. A transverse beam 43 extends below the drill support 40 across the horizontal bed 10 of the frame below the conveyor 16. At one side of the transverse beam 43 is a rotary drill support platform 44 having a vertical axis 45 spaced from the conveyor 16. The drill support 40 is pivotaly secured to this rotary platform 44 by a pivot pin 46 which is positioned a radial distance from the axis 45, as best seen in FIG. 7, so that rotary movement of the platform 44 will cause the drill support 40 and the drill bit 38 to reciprocate back and forth toward and away from the conveyor 16. Thus, as seen in FIG. 7, rotation of the rotary platform 44 on its axis 45 will cause the entire drill support 40 and drill bit 38 to move in a circle about the axis 45.

Because the necks of the bottles B carried by the conveyor 16 pass the drill bit 38 in a position generally normal to the path of movement of the conveyor 16, it is necessary to maintain the axis of the drill bit 38 and its shaft 39 parallel to the axis of the bottle, or at right angles to the path of movement of the conveyor. This can be done by a number of mechanisms and, in the preferred embodiment described, it is done in conjunction with a lateral article support 47 which includes a dish-shaped member 48, best seen in FIG. 7, which is adapted to seat upon the bottom of the bottle B (after the tail 28 has been removed) to provide resistance against lateral movement while the neck of the bottle B is being drilled by the drill bit 38. It should be understood that with certain modifications of the bottle carriers 24, such a lateral support 47 would be unnecessary. However, in the preferred embodiment being described, the lateral support 47 includes the dish member 48 secured against rotation on a support member 49 which is pivotally supported upon a second rotary platform 50 which is journaled for rotation upon the transverse beam 43, as best seen in FIG. 6. A pivot pin 51 extending from the second rotary platform 50 is again spaced from that platform's axis of rotation 52 so that rotation of the second platform 50 will cause the support member 49 and its attached dish member 48 to rotate in a circle about the axis 52, and to reciprocate toward and away from the conveyor 16.

Secured to the upper surface of the drill support 40 are a pair of bushings 53 and secured to and above the support member 49 are a pair of sliding bearings 54. A pair of transverse guide shafts 55 extend through the bushings 53 and sliding bearings 54 and have one end secured within the bushings 53. It will be readily seen that as the drill support 40 and lateral support member 49 move in their circular paths around the axes 45 and 52, respectively, the guide shafts 55 will maintain the axes of the drill bit 38 and the dish member 48 in a constant parallel position relative to one another and relative to the axes of the bottles B being trimmed. Thus, the axis of the drill bit 38 and the axis of the dish member 48 will always be parallel and will always be substantially normal to the path of movement of the conveyor.

FIG. 6 best illustrates the drive mechanism which causes the rotation of the rotary platforms 44 and 50. Each of these platforms 44 and 50 may be integrally formed with external teeth or attached to a separate coaxial sprocket 56 and 57, respectively, whose teeth engage an endless chain 58 which extends around a drive sprocket 59 whose drive shaft 60 is journaled in one end of the transverse beam 43. A crowder sprocket 61 is used, as shown in FIG. 6. The drive shaft 60 secured to the drive sprocket 59 extends downwardly from the transverse beam 43 and terminates in a pinion gear 62 which is driven by a worm 63 secured to a stub shaft 64 whose outer end is secured to a chain sprocket 65, the details of which are best seen in FIGS. 6 and 1. A drive chain 66 connects the chain sprocket 65 with a large sprocket 67 which is secured to one end of the shaft of the roller 14 of the conveyor 16, which shaft is driven by the chain sprocket 23 through the chain 22 which is engaged to the conveyor drive motor 21. Thus, it will be seen that the drive chain 58 engaging the rotary platforms 44 and 52 is moved by the same motor 21 which causes movement of the conveyor 16.

Referring again to FIGS. 6 and 7, rotation of the drive sprocket 59, in the direction of the arrow shown thereon, causes the chain 58 to move the rotary platforms 44 and 50 in opposite directions, as shown by the arrow adjacent their sprockets 56 and 57. If the pivot pins 46 and 51 are initially positioned on the inside toward one another, as shown in FIG. 7, the rotation of the rotary platforms 44 and 50 will cause the drill bit 38 and the dish member 48 to reciprocate toward and away from each other as their axes are maintained in constant alignment by the guide shafts 55 described above. Referring to FIG. 7, the distances of the pivot pins 46 and 51 from the axes of rotations of their respective support platforms 44 and 50 are such that, when the pins are in their innermost position, as shown in FIG. 7, the distance between the drill bit 38 and the bottom of the dish member 48, indicated by letter $d$ in FIG. 7, is substantially equal to the finished height of a trimmed bottle B', as shown in FIG. 5. If the rotary platforms 44 and 50 are rotated 180° from the position shown in FIG. 7, the distance between the drill bit 38 and bottom portion of the dish member 48 increases due to the movement of the respective pivot pins 46 and 51 to the other side of the axes 45 and 52, respectively, so that the distance between these members is larger than the height $d$ of the finished bottle B'. Thus, it will be seen that continued movement of the rotary platforms 44 and 50 will cause the drill bit 38 and dish member 48 to reciprocate from a remote position, out of engagement with any bottle and free of interference with the conveyor, to a trimming or engagement position at which the drill bit 38 contacts the upper neck surface 31 of the bottle being trimmed. It will also be seen that, as the drill bit 38 and dish member 48 move from their positions shown in FIG. 6 toward the positions shown in FIG. 7, they have a component of movement parallel to the movement of the bottles B carried by the conveyor 16. This component of movement parallel to the movement of the conveyor continues through the position shown in FIG. 7 as the rotary platforms 44 and 50 continue rotation to move the drill bit 38 and dish member 48 out of engagement with the now-trimmed bottle B'. During this period in which the drill bit 38 and dish member 48 move with the bottle B in the direction of movement of the conveyor 16, the drill bit has time to engage each bottle B to complete the trimming operation thereon.

It will also be seen that there is only one position, that shown in FIG. 7, in which the distance $d$ between the drill bit 38 and bottom of the dish member 48 is equal to the height of the trimmed bottle B' as shown in FIG. 5. Because the drill bit 38 and dish member 48 approach each other in an arcuate path, starting from the position shown in FIG. 6, initial engagement with the untrimmed bottle B is gradually made so that the drill bit 38 begins to remove excess material as the drill bit 38 and dish member 48 start their component of movement parallel with the movement of the bottle on the conveyor 16. As the drill bit 38 and dish 48 progress toward their closest position, as shown in FIG. 7, the component of inward movement decreases to decrease the rate of material removal until the position of FIG. 7 is reached, at which time further movement of the drill bit 38 and dish member 48 beyond this position starts their movement away from each other so that the drill bit 38 is gradually disengaged from the neck of the bottle to perform a fine finishing operation thereon.

For any particular bottle size, the ultimate distance $d$ can be adjusted by means of an axial adjustment provided by a collar 68 connecting the drill bit to its shaft 39. Further compensation is provided through use of a resilient pad 69 placed in the bottom of the dish member 48.

From the above description, it will be seen that precise initial positioning of the drill bit 38 and dish member 48 in line with a bottle carrier 24 on the conveyor 16, as shown in FIG. 6, is all that is needed to assure perfect synchronization between the drill bit 38 and the bottles B carried by the carriers 24 on the conveyor 16. Because both the conveyor 16 and the drive mechanism for the drill bit 38 are driven by a common power source (the motor 21), initial synchronization will be maintained without the necessity for reliance upon complex electrical speed controls, timing devices, photo cells, etc.

Finally, it will be apparent to those skilled in the art that through use of various chain sprocket sizes, variable spacing of the bottle carriers 24 along the conveyor 16 can be accommodated and, once initial synchronization is perfected, the ultimate speed of the conveyor and trimming apparatus can be adjusted by electrical speed controls of the motor 21 without disturbing the synchronization.

It will thus be seen that the above described preferred embodiment of the bottle trimming apparatus of this invention accomplishes the desired objective of high speed trimming of undesired flash and waste from blown plastic bottles and other articles. The principles of this invention may be adapted for use in similar trimming or finishing operations which are to be performed upon a plurality of similar articles and various modifications may be made to the above described preferred embodiment without departing from the spirit and scope of the attached claims.

I claim:

1. In an apparatus for trimming molded plastic articles including a continuously moving conveyor for serially moving such articles in a linear path past a driven trimming tool rotating about an axis and reciprocating in a direction substantially normal to the path of movement of said conveyor, the improvement comprising a mechanism for continuously reciprocating said trimming tool from a remote position away and free of such articles thereon to an engaged position in trimming engagement with one of such articles on said conveyor, said mechanism comprising a support for said trimming tool adjacent one side of said conveyor for holding said trimming tool in alignment with the portion to be trimmed on such articles carried by said conveyor, a driven rotary platform below said tool support having an axis laterally spaced from said conveyor and extending normal to the axis of said trimming tool, a pivot pin rotatably journaling said tool support upon said rotary platform with the axis of said pivot pin being parallel to but radially spaced from the axis of said rotary platform whereby rotation of said platform will cause said trimming tool to reciprocate between its said remote and engaged positions as said pivot pin is moved about said axis of said rotary platform.

2. The apparatus of claim 1 which further includes a second driven rotary platform on the other side of said conveyor opposite said trimming tool with its axis of rotation laterally spaced from said conveyor and normal to said trimming tool axis, an article support member rotatably journaled upon said second driven platform on a pivot axis parallel to but radially spaced from the axis of rotation of said second platform whereby rotation of said second platform will cause said article support to reciprocate from a remote position away and free of such articles on said conveyor to an engaged position in lateral supporting engagement with one of said articles on said conveyor and means for driving said driven rotary platforms in synchronism whereby said trimming tool and said article support member pass through their said remote and said engaged positions in synchronism with each other.

3. The apparatus of claim 2 wherein said synchronous drive means includes an endless drive chain engaged with the outer periphery of both of said driven platforms.

4. The apparatus of claim 2 which further includes means for adjusting the lateral distance between said trimming tool and said article support member to accommodate various sizes of articles to be trimmed.

5. The apparatus of claim 1 wherein said trimming tool is a driven drill having an axis maintained substantially normal to the axis of the direction of movement of said conveyor and wherein the trimming drill is moved laterally in the direction of movement of said conveyor while in its said second position in trimming engagement with one of said articles.

6. The apparatus of claim 5 wherein the speed of lateral movement of said trimming tool while in its said second position is equal to the speed of movement of said conveyor.

7. The apparatus of claim 1 in which said conveyor includes a plurality of equally spaced apart article supports for holding such plastic articles in equally spaced positions along said conveyor and which further includes a synchronous drive means for said conveyor and said driven rotary platform whereby said trimming tool will serially engage each of said equally spaced articles when in its said second position in trimming engagement therewith.

8. An apparatus for reaming the necks of molded plastic bottles comprising, in combination, a continuously moving horizontal conveyor, a plurality of bottle carriers equally spaced apart on said conveyor for aligning and holding said bottles with their axes horizontal and normal to said conveyor path as said aligned bottles pass a trimming station, a trimming drill adjacent said conveyor at said trimming station, said drill having an axis of rotation parallel to said aligned bottle axes, and means for reciprocating said trimming drill between a remote position away from said conveyor and bottles and an engaged position with said drill in reaming engagement with the neck of a bottle on said conveyor, said means including a drill support and guide for maintaining the axis of said drill normal to the path of said conveyor and parallel to said aligned bottle axes, a rotary platform below said drill support driven about an axis spaced from said conveyor path and normal to the axes of said drill, a pivot means supporting said tool support upon said rotary platform on a pivot axes parallel to but radially spaced from said rotary platform axis and means for driving said conveyor and rotary platform in synchronous relation whereby rotation of said platform will cause said trimming drill to reciprocate between its said remote and engaged positions to serially engage each bottle on said conveyor as it passes said trimming station.

9. The apparatus of claim 8 which further includes a second rotary platform on the other side of said conveyor opposite said trimming drill with its axis of rotation laterally spaced from said conveyor and parallel to the axis of said first platform, a bottle bottom support member pivotally supported upon said second platform on a pivot axis parallel to but radially spaced from the axis of rotation of said second platform such that rotation of said second platform will reciprocate said bottle bottom support between a remote position away from said conveyor and an engaged position against the bottom of a bottle on said conveyor and means for driving said second rotary platform in synchronous relation with said first platform such that said trimming drill and bottle bottom support simultaneously engage each bottle on said conveyor as it passes said trimming station.

10. The apparatus of claim 9 wherein said means for driving said first and second platforms in synchronous relation is an endless drive member in driving engagement with each of said platforms.

References Cited
UNITED STATES PATENTS

| | | | |
|---|---|---|---|
| 3,228,086 | 1/1966 | Brown et al. | 29—33.12 |
| 3,230,602 | 1/1966 | Bozek | 29—33.12 |

ANDREW R. JUHASZ, Primary Examiner
Z. R. BILINSKY, Assistant Examiner